United States Patent
Huang et al.

(10) Patent No.: US 9,626,323 B2
(45) Date of Patent: Apr. 18, 2017

(54) KEYBOARD-VIDEO-MOUSE SWITCH AND OPERATING METHOD THEREOF

(71) Applicant: ATEN International Co., Ltd., New Taipei (TW)

(72) Inventors: Shih-Jung Huang, New Taipei (TW); Yi-Jen Chen, New Taipei (TW); Yung-Bin Lin, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 69 days.

(21) Appl. No.: 14/712,809

(22) Filed: May 14, 2015

(65) Prior Publication Data

US 2016/0147691 A1   May 26, 2016

(30) Foreign Application Priority Data

Nov. 26, 2014 (TW) .............................. 103141019 A

(51) Int. Cl.
*G06F 13/40* (2006.01)
*G06F 3/02* (2006.01)
*G06F 13/10* (2006.01)

(52) U.S. Cl.
CPC ........ *G06F 13/4022* (2013.01); *G06F 3/0227* (2013.01); *G06F 13/102* (2013.01)

(58) Field of Classification Search
None
See application file for complete search history.

(56) References Cited

U.S. PATENT DOCUMENTS

| 8,266,363 B2 | 9/2012 | Chou et al. |
| 2005/0216620 A1 | 9/2005 | Sandulescu et al. |

(Continued)

FOREIGN PATENT DOCUMENTS

| TW | 539173 | 6/2003 |
| TW | 200622833 | 7/2006 |
| TW | 201327150 | 7/2013 |

OTHER PUBLICATIONS

Taiwanese Office Action, dated Aug. 24, 2015, in a counterpart Taiwanese patent application, No. TW 103141019.

(Continued)

*Primary Examiner* — Scott Sun

(74) *Attorney, Agent, or Firm* — Chen Yoshimura LLP

(57) ABSTRACT

A keyboard-video-mouse (KVM) switch and an operating method thereof are disclosed. The KVM switch is coupled between at least one peripheral device and controlled computers. The method includes steps of: determining whether the hot-key mode of KVM switch is started; if yes, when the KVM switch receives a first signal from a specific controlled computer of the controlled computers, directly passing the first signal to a corresponding specific peripheral device of the at least one peripheral device; when the KVM switch receives a second signal in response from the specific peripheral device within a predetermined period of time, determining whether the second signal includes a specific data; if yes, replacing the specific data in the second signal with an irrelevant data to form a third signal and transmitting the third signal to the specific controlled computer. The irrelevant data corresponds to the specific controlled computer and has no effect on the specific controlled computer.

15 Claims, 3 Drawing Sheets

(56) References Cited

U.S. PATENT DOCUMENTS

2011/0246676 A1* 10/2011 Chou ..................... G06F 3/023
710/8
2012/0284449 A1 11/2012 Tung et al.

OTHER PUBLICATIONS

Extended European Search Report, dated Nov. 26, 2015, in a counterpart EP patent application, No. 15171144.7.
Iogear, "MiniView (TM) Micro USB Plus 2-Port KVM Switch with Built-in KVM Cables and Audio Support Installation Manual (GCS632U)", Sep. 24, 2005, retrieved from the internet on Oct. 19, 2016. "https://www.iogear.com/support/manual/GCS632U.pdf", 33 pages.

* cited by examiner

KEYBOARD-VIDEO-MOUSE SWITCH AND OPERATING METHOD THEREOF

BACKGROUND OF THE INVENTION

Field of the Invention

This invention relates to keyboard-video-mouse (KVM) switches, and in particular, it relates to a KVM switch and its operation method.

Description of the Related Art

Typically, a conventional KVM switch is coupled between peripheral devices and controlled computers. When the KVM switch is operating in a bypass mode, if it receives a signal from a peripheral device, the KVM switch does not alter the signals from the peripheral device; rather, it directly forwards the signal from the peripheral device to the controlled computer.

When the peripheral device is a keyboard, when a hotkey mode of the KVM switch is initiated, the user can operate predefined hotkeys on the keyboard (such as the Enter key or the Esc key) to control various functions of the KVM switch (such as switching the KVM switch to different controlled computers).

However, when the KVM switch is operating in the bypass mode, the hotkey data from the peripheral device (such as the Enter key, the Esc key value, or a number key value) will be forwarded by the KVM switch directly to the controlled computer. Because some of the hotkey data (such as the Enter key, the Esc key value, or a number key value) can have certain adverse effects on the controlled computer (for example, in a word processing program, these key values may cause the cursor to automatically move to the next line or automatically exits an application program's interface image), such effects may seriously interfere with the normal operation of the controlled computer, causing inconvenience and confusion for the user.

SUMMARY OF THE INVENTION

Accordingly, the present invention is directed to a KVM switch and its operation method that substantially obviates one or more of the problems due to limitations and disadvantages of the related art.

An embodiment of the present invention provides an operation method of a KVM switch. In this embodiment, the method is for operating a KVM switch which is coupled between at least one peripheral device and a plurality of controlled computers.

The KVM switch operation method includes the following steps: (a) determining whether a hotkey mode of the KVM switch is initiated; (b) if the determination in step (a) is affirmative, when the KVM switch receives a first signal from a specific one of the controlled computers, directly forwarding the first signal to a corresponding specific one of the plurality of peripheral devices; (c) when, within a predetermined time interval after forwarding the first signal, the KVM switch receives from the specific peripheral device a second signal in response, determining whether the second signal contains a predetermined data; and (d) if the determination in step (c) is affirmative, replacing the predetermined data in the second signal with an irrelevant data to generate a third signal, and transmitting the third signal to the specific controlled computer, wherein the irrelevant data corresponds to the specific controlled computer and has no effect on the specific controlled computer. In one embodiment, step (c) includes: (c1) when the KVM switch receives the second signal, determining whether the second signal is from the specific peripheral device; and (c2) if the determination in step (c1) is affirmative, determining whether the second signal contains the predetermined data.

In one embodiment, the specific peripheral device is a human interface device (HID). In one embodiment, if the determination in step (a) is negative, the method further includes the following steps: (b') when the KVM switch receives a first signal from the specific one of the controlled computers, directly forwarding the first signal to the specific peripheral device; and (c') when the KVM switch receives from the specific peripheral device a second signal in response, directly forwarding the second signal to the specific controlled computer. In one embodiment, if the determination in step (c) is negative, the method further includes: (d') directly forwarding the second signal to the specific controlled computer.

In one embodiment, the KVM switch operates under a bypass mode. In one embodiment, the predefined data includes hotkey data that adversely affect functions and operations of the specific of controlled computers. Another embodiment of the present invention is a KVM switch. In this embodiment, the KVM switch is coupled between at least one peripheral device and a plurality of controlled computers. The KVM switch includes a first transmitting/receiving module, a second transmitting/receiving module, and a control module. The first transmitting/receiving module is coupled to the at least one peripheral device. The second transmitting/receiving module is coupled to the plurality of controlled computers. The control module is coupled to the first transmitting/receiving module and the second transmitting/receiving module. The control module determines whether a hotkey mode of the KVM switch is initiated. If it is, the first transmitting/receiving module directly forwards the first signal, received by the second transmitting/receiving module from a specific one of the controlled computers, to a corresponding specific one of the at least one peripheral devices. When the first transmitting/receiving module receives from the specific peripheral device, within a predetermined time interval after the first signal, a second signal in response, the control module determines whether the second signal contains a predetermined data. If it does, the control module replaces the predetermined data in the second signal with an irrelevant data to generate a third signal, and the second transmitting/receiving module transmits the third signal to the specific controlled computer. The irrelevant data corresponds to the specific controlled computer and has no effect on the specific controlled computer.

Compared to conventional technologies, the KVM switch and its operation method according to embodiments of the present invention have the following advantages:

(1) When the KVM switch is operating in the bypass mode, even when the KVM switch receives hotkey data (such as the Enter key, Esc key value or number key value) from a specific peripheral device (such as a keyboard), the KVM switch replaces the hotkey data with irrelevant data before transmitting it to the controlled computer, to prevent the hotkey data from adversely affecting the function of the controlled computer.

(2) Because the KVM switch can be simultaneously coupled to multiple peripheral devices, the KVM switch will perform the above data replacement only for data from the specific peripheral device (such as a keyboard) that would adversely affect the specific controlled computer, while still forwarding signals from other peripheral devices that do not adversely affect the controlled computer directly to the controlled computer.

DETAILED DESCRIPTION OF THE PREFERRED EMBODIMENTS

A preferred embodiment of the present invention is a KVM switch. In this embodiment, the KVM switch is coupled between at least one peripheral device and a plurality of controlled computers. In practice, the at least one peripheral device may be a human interface device (HID), such as keyboard or mouse; the controlled computers may be, without limitation, server computers, personal computers, or tablet computers.

Figure 1:
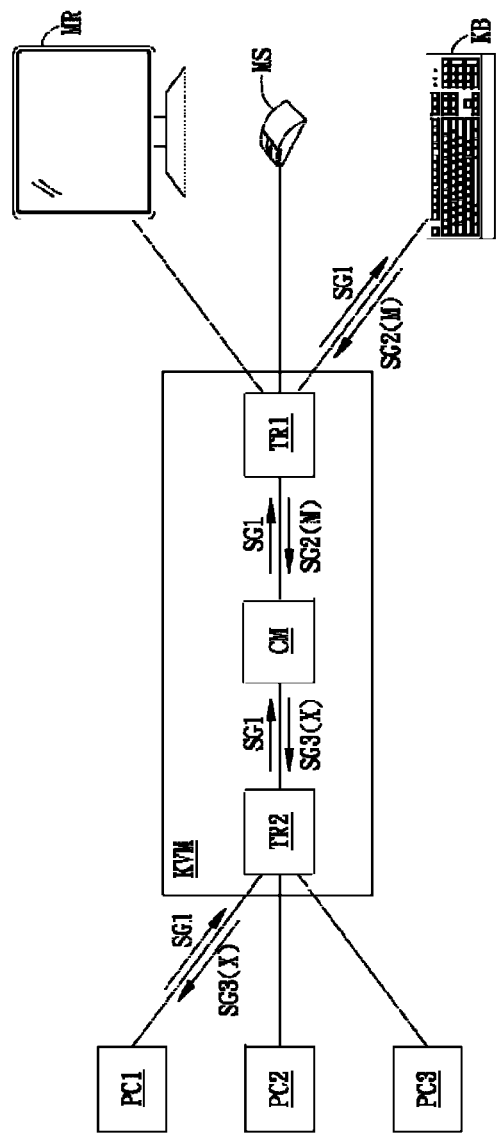
FIG. 1 is a functional block diagram of a KVM switch coupled between peripheral devices and controlled computers according to an embodiment of the present invention.

Referring to FIG. 1, which is a functional block diagram of a KVM switch coupled between peripheral devices and controlled computers according to this embodiment. As shown in FIG. 1, the KVM switch KVM is coupled between peripheral devices MR, MS and KB and controlled computers PC1-PC3.

In this embodiment, the KVM switch includes a first transmitting/receiving module TR1, a second transmitting/receiving module TR2, and control module CM. The first transmitting/receiving module TR1 is respectively coupled to the display monitor MR, the mouse MS and the keyboard KB with respective bi-directional signal communications. The second transmitting/receiving module TR2 is respectively coupled to the controlled computers PC1-PC3 with respective bi-directional signal communications. The control module CM is respectively coupled to the first and second transmitting/receiving modules TR1 and TR2.

In practical applications, the control module CM may be implemented by, without limitation, an application-specific integrated circuit (ASIC). The KVM switch may further include a number of interface ports coupled to the first transmitting/receiving module TR1, such as, without limitation, up to 127 Universal Serial Bus (USB) ports. The peripheral devices may be, respectively and without limitation, a monitor MR, a mouse MS and a keyboard KB, which may be coupled to the first transmitting/receiving module TR1 via the interface ports of the KVM switch and communicate with the KVM switch bi-directionally using, for example the USB protocol.

It is to be noted that, embodiments of the present invention is to solve problems of the bypass mode, namely, the functions and operation of controlled computer being adversely affected by hotkey data; thus, the operation methods of the KVM switch described in these embodiments apply to the bypass mode and do not apply to the emulation mode of the KVM switch.

First, the control module CM determines whether a hotkey mode of the KVM switch is initiated. If the determination is affirmative, i.e., the hotkey mode is initiated, and if at this time the second transmitting/receiving module TR2 receives a first signal SG1 from a specific controlled computer PC1 among the controlled computers PC1-PC3, the control module CM forwards the first signal SG1 directly to the first transmitting/receiving module TR1, and the first transmitting/receiving module TR1 directly forwards the first signal SG1 to a corresponding specific one among the peripheral devices MR, MS and KB, for example and without limitation, the keyboard KB.

In practical implementation, the KVM switch, which acts as a USB host, can analyze the USB addresses and endpoints of the peripheral devices MR, MS and KB, which act as USB devices, to recognize which of the peripheral devices is the keyboard KB.

On the other hand, if the above determination of the control module CM is negative, i.e. the hotkey mode of the KVM switch is not initiated, then none of the controlled computers PC1-PC3 will be adversely affected by hotkey data; thus, the KVM switch will maintain its operation in the bypass mode, i.e., the KVM forwards signals from the peripheral devices MR, MS and KB directly to the controlled computers PC1-PC3 via the second transmitting/receiving module TR2, and forwards the signals from the controlled computers PC1-PC3 directly to the peripheral devices MR, MS and KB via the first transmitting/receiving module TR1, without applying any signal processing to the signals.

When the hotkey mode is initiated, after the KVM switch directly forwards the first signal SG1 to the keyboard KB via the first transmitting/receiving module TR1, the first transmitting/receiving module TR1 of the KVM switch will expect a response from the keyboard KB within a predetermined time interval. Thus, when the first transmitting/receiving module TR1 of the KVM switch receives a second signal SG2 within that time interval, the control module CM of the KVM switch first determines whether the second signal SG2 is from the keyboard KB. If the determination is affirmative, i.e. the second signal SG2 received by the first transmitting/receiving module TR1 is a response signal from the keyboard KB, then the control module CM further determines whether the second signal SG2 contains a predetermined data M.

It is noted that the predetermine data M includes hotkey data (such as the Enter key, the Esc key value, or a number key value) that may have certain effects on the controlled computers PC1-PC3 and adversely affect the function and operation of these computers (for example, in a word processing program, these key values may cause the cursor to automatically move to the next line or automatically exits an application program's interface image), or other similar data, and are not limited to the above.

If the determination of the control module CM is affirmative, i.e. the second signal SG2 contains predetermined data M that would adversely affect the function and operation of the controlled computer, the control module CM replaces the predetermined data M in the second signal SG2 with an irrelevant data X to generate a third signal SG3. It is noted that, unlike the data M that would adversely affect the function and operation of the controlled computer, the irrelevant data X has no effect on the controlled computer. In other words, any data that has no effect on the controlled computer can be the irrelevant data X, for example and without limitation, a negative acknowledgement (NAK) signal, etc. In practice, the irrelevant data X may correspond to the specific controlled computer PC1 and has no effect on PC1 (but may have effects on other controlled computers), or it may correspond to all controlled computers PC1-PC3 and has no effect on any of these controlled computers.

Then, the control module CM transmits the third signal SG3 including the irrelevant data X to the second transmitting/receiving module TR2, and the second transmitting/receiving module TR2 transmits it to the specific controlled computer PC1. Because the irrelevant data X in the third signal SG3 has no effect on the specific controlled computer PC1, when the specific controlled computer PC1 receives the third data SG3, its function and operation are not adversely affected. This obviates the problem of the conventional technology, namely the adverse effects of the hotkey data on the function and operation of the controlled computer. In practical implementations, the second transmitting/receiving module TR2 may be a switching circuit, where its switching action is controlled by the control module CM to select whether to forward the second signal SG2 directly to the specific controlled computer PC1 or to transmit the replaced third signal SG3 to the specific controlled computer PC1.

When the determination of the control module CM is affirmative, the control module CM replaces the predetermined data M in the second signal SG2 with the irrelevant data X to generate the third signal SG3, and switches the transmitting/receiving module TR2 to select the third signal SG3 to be transmitted to the specific controlled computer PC1. When the determination of the control module CM is negative, the control module CM switches the transmitting/receiving module TR2 to select the second signal SG2 to be directly forwarded to the specific controlled computer PC1.

Figure 2:
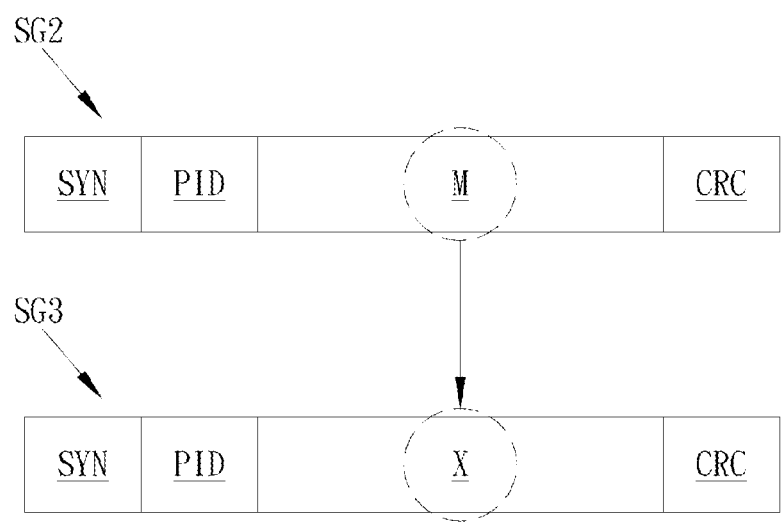
FIG. 2 schematically illustrates replacing predetermined data in a second signal with irrelevant data to form a third signal.

For example, as shown in FIG. 2, assume that the second signal SG2 form the keyboard KB sequentially includes a sync field SYN, a packet identifier field PID, a predetermined data field M, and a cyclic redundancy check field CRC, etc. The control module CM will determine that the second signal SG2 includes the predetermined data M; therefore, the control module CM will replace the predetermined data M in the second signal SG2 with irrelevant data X to generate the third signal SG3.

It should be noted that although the above replacement process by the control module CM performed on the second signal SG2 to generate the third signal SG3 will cause a delay between the time of output of the second signal SG2 by the keyboard KB and the time of receipt of the third signal SG3 by the specific controlled computer PC1, experiments showed that this delay is not significant, and is within the permitted length of delay of the USB transmission protocol.

In practical application, the KVM switch may use lower-level logic's automatic response to automatically respond to the specific controlled computer PC1 and the keyboard KB; for example, the KVM switch has an automatic response engine implemented by an ASIC, which significantly reduces the processing time of the control module CM, so that the overall response speed of the system is improved.

On the other hand, if the control module CM determines that the second signal SG2 from the keyboard KB does not include the predetermined data M, meaning that the second signal SG2 will not adversely affect the operations of the specific controlled computer PC1, the second transmitting/receiving module TR2 will directly forward the second signal SG2 to the specific controlled computer PC1.

Another embodiment of the present invention is an operation method of a KVM switch. In this embodiment, the method is for operating the KVM switch, which is coupled between at least one peripheral device and a plurality of controlled computers. In practice, the peripheral device may be a human interface device (HID), such as a keyboard, mouse or other input devices, but is not limited to such. The controlled computers may be, without limitation, server computers, personal computers, or tablet computers.

It is to be noted that, in this embodiment, the operation methods of the KVM switch apply to the bypass mode and do not apply to the emulation mode. In other words, the embodiment is a modification of the conventional bypass mode, as in the conventional bypass mode the KVM switch directly forwards the signals from the peripheral devices to the controlled computers, and directly forwards the signals from the controlled computers to the peripheral devices, without any processing of these signals.

Figure 3:
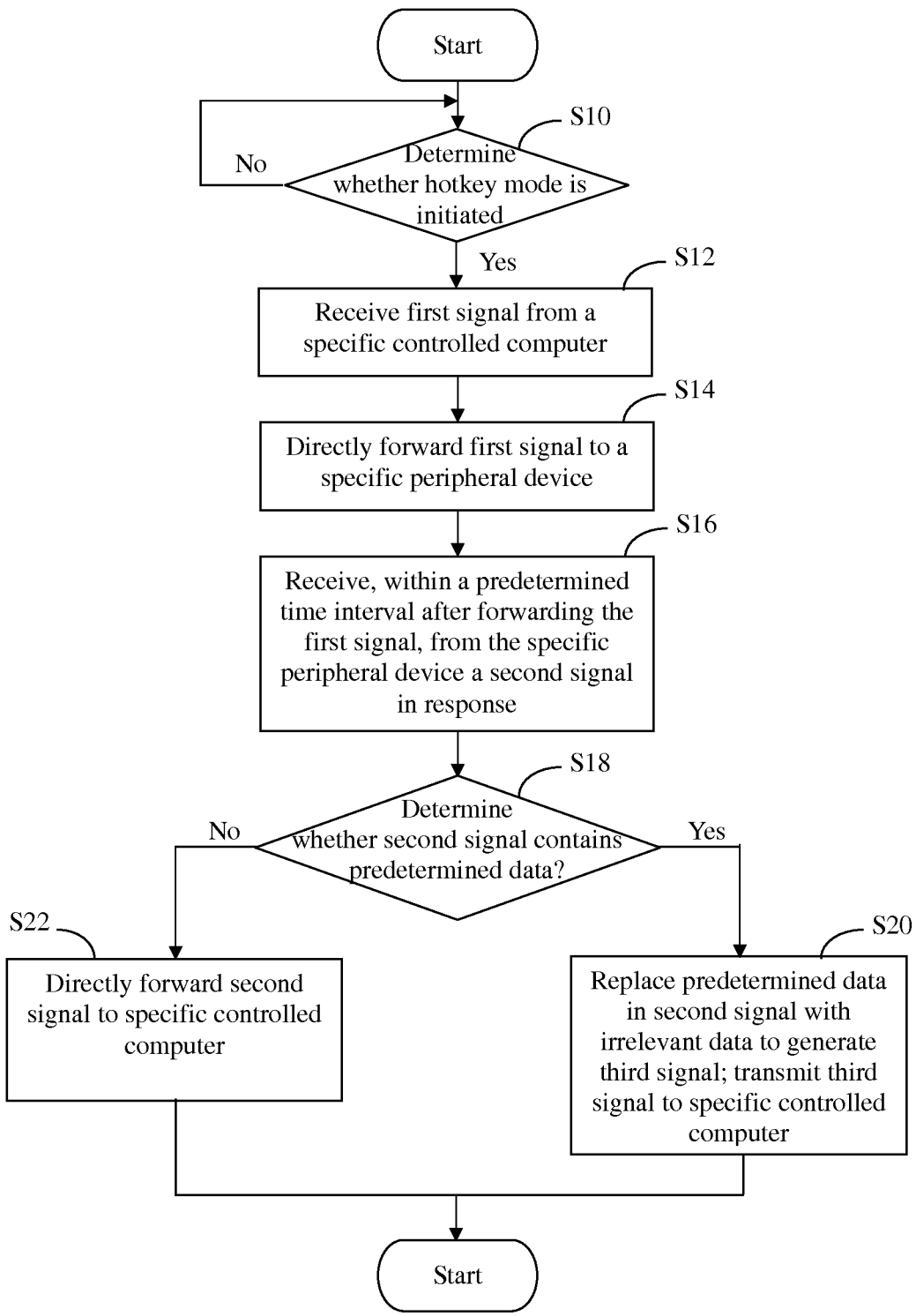
FIG. 3 schematically illustrates an operation method of a KVM switch according to an embodiment of the present invention.

Refer to FIG. 3, which is a flow chart illustrating an operation method of a KVM switch in this embodiment. As shown in FIG. 3, first, in step S10, the process determines whether a hotkey mode of the KVM switch is initiated.

If the determination in step S10 is affirmative, i.e., the hotkey mode is initiated, and in step S12, the KVM switch receives a first signal from a specific controlled computer among the controlled computers, the process goes to step S14, to forward the first signal directly to a corresponding specific one of the at least one peripheral device.

If the determination in step S10 is negative, i.e. the hotkey mode of the KVM switch is not initiated, then the process maintains the operation in the bypass mode and repeats step S10. In other words, in the bypass mode, when the KVM switch receives the first signal from the specific controlled computer, it forwards the first signal directly to the specific peripheral device, and when the KVM switch receives from the specific peripheral device a second signal in response, the KVM switch directly forwards the second signal to the specific controlled device.

Then, in step S16, when the KVM switch receives from the specific peripheral device, within a predetermined time interval, a second signal in response, the process goes to step S18 to determine whether the second signal contains a predetermined data. It should be noted that in step S16, when the KVM switch receives the second signal, the process first determines whether the second signal is from the specific peripheral device. If the determination is affirmative, step S18 is performed to determine whether the second signal contains the predetermined data.

If the determination in step S18 is affirmative, i.e. the second signal contains the predetermined data, the process goes to step S20, to replace the predetermined data in the second signal with an irrelevant data to generate a third signal, and to transmit the third signal to the specific controlled computer. The irrelevant data corresponds to the specific controlled computer and has no effect on the specific controlled computer.

If the determination in step S18 is negative, i.e. the second signal does not contain the predetermined data, the process goes to step S22, to forward the second signal directly to the specific controlled computer.

Compared to conventional technologies, the KVM switch and its operation method according to embodiments of the present invention have the following advantages:

(1) When the KVM switch is operating in the bypass mode, even when the KVM switch receives hotkey data (such as the Enter key, Esc key value or number key value) from a specific peripheral device (such as a keyboard), the KVM switch replaces the hotkey data with irrelevant data before transmitting it to the controlled computer, to prevent the hotkey data from adversely affecting the function of the controlled computer.

(2) Because the KVM switch can be simultaneously coupled to multiple peripheral devices, the KVM switch will perform the above data replacement only for data from the specific peripheral device (such as a keyboard) that would adversely affect the controlled computer, while still forwarding signals from other peripheral devices that do not adversely affect the controlled computer directly to the controlled computer.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method for operating a keyboard-video-mouse (KVM) switch, the KVM switch being coupled between at least one peripheral device and a plurality of controlled computers, the method comprising:
   (a) determining whether a hotkey mode of the KVM switch is initiated;
   (b) if the determination in step (a) is affirmative, when the KVM switch receives a first signal from a specific one of the controlled computers, directly forwarding the first signal to a corresponding specific one of the plurality of peripheral devices;
   (c) when, within a predetermined time interval after forwarding the first signal, the KVM switch receives from the specific peripheral device a second signal in response, determining whether the second signal contains a predetermined data; and
   (d) if the determination in step (c) is affirmative, replacing the predetermined data in the second signal with an irrelevant data to generate a third signal, and transmitting the third signal to the specific controlled computer, wherein the irrelevant data corresponds to the specific controlled computer and has no effect on the specific controlled computer.

2. The method of claim 1, wherein step (c) includes:
   (c1) when the KVM switch receives the second signal, determining whether the second signal is from the specific peripheral device; and
   (c2) if the determination in step (c1) is affirmative, determining whether the second signal contains the predetermined data.

3. The method of claim 2, wherein the specific peripheral device is a human interface device (HID).

4. The method of claim 1, wherein if the determination in step (a) is negative, the method further comprises:
   (b') when the KVM switch receives a first signal from the specific one of the controlled computers, directly forwarding the first signal to the specific peripheral device; and
   (c') when the KVM switch receives from the specific peripheral device the second signal in response, directly forwarding the second signal to the specific controlled computer.

5. The method of claim 1, wherein if the determination in step (c) is negative, the method further comprises:
   (d') directly forwarding the second signal to the specific controlled computer.

6. The method of claim 1, wherein the KVM switch operates under a bypass mode.

7. The method of claim 1, wherein the predetermined data includes hotkey data that adversely affect functions and operations of the specific of controlled computers.

8. A keyboard-video-mouse (KVM) switch, coupled between at least one peripheral device and a plurality of controlled computers, comprising:
   a first transmitting/receiving module coupled to the at least one peripheral device;
   a second transmitting/receiving module coupled to the plurality of controlled computers, and
   a control module coupled to the first transmitting/receiving module and the second transmitting/receiving module,
   wherein the control module determines whether a hotkey mode of the KVM switch is initiated, and if it is, the first transmitting/receiving module directly forwards a first signal which is received by the second transmitting/receiving module from a specific one of the controlled computers to a corresponding specific one of the at least one peripheral devices,
   wherein when the first transmitting/receiving module receives from the specific peripheral device, within a predetermined time interval after the first signal, a second signal in response, the control module determines whether the second signal contains a predetermined data, and wherein if it does, the control module replaces the predetermined data in the second signal with an irrelevant data to generate a third signal, and the second transmitting/receiving module transmits the third signal to the specific controlled computer, wherein the irrelevant data corresponds to the specific controlled computer and has no effect on the specific controlled computer.

9. The KVM switch of claim 8, wherein when the first transmitting/receiving module receives the second signal, the control module determines whether the second signal is from the specific peripheral device, and if it is, the control module further determines whether the second signal contains the predetermined data.

10. The KVM switch of claim 9, wherein the specific peripheral device is a human interface device (HID).

11. The KVM switch of claim 8, wherein if the control module determines that the hotkey mode of the KVM switch is not initiated, the first transmitting/receiving module directly forwards the first signal to the specific peripheral device, and the second transmitting/receiving module directly forwards the second signal to the specific controlled computer.

12. The KVM switch of claim 8, wherein if control module determines that the second signal does not contain the predetermined data, the second transmitting/receiving module directly forwards the second signal to the specific controlled computer.

13. The KVM switch of claim 8, wherein the KVM switch operates under a bypass mode.

14. The KVM switch of claim 8, wherein the second transmitting/receiving module is a switching circuit, which is controlled by the control module to selectively either forward the second signal directly to the specific controlled computer or transmit the third signal to the specific controlled computer.

15. The KVM switch of claim 8, wherein the predetermined data includes hotkey data that adversely affect functions and operations of the specific of controlled computers.

* * * * *